United States Patent [19]

Kondo

[11] Patent Number: 4,465,219

[45] Date of Patent: Aug. 14, 1984

[54] SOLDERING APPARATUS

[75] Inventor: Kenshi Kondo, Tokyo, Japan

[73] Assignee: Nihon Den-Netsu Keiki Co., Ltd., Tokyo, Japan

[21] Appl. No.: 381,390

[22] Filed: May 24, 1982

[30] Foreign Application Priority Data

Jun. 2, 1981 [JP] Japan .................. 56-83825

[51] Int. Cl.³ ................. B23K 1/08; H05K 3/34
[52] U.S. Cl. .................. 228/37; 228/180 A; 228/260
[58] Field of Search ................. 228/37, 180 A, 180 R, 228/260

[56] References Cited

U.S. PATENT DOCUMENTS 3,151,592 10/1964 Wegener ........................ 228/37
3,303,983 2/1967 Patrick ......................... 228/37
3,565,319 2/1971 Eschenbrucher ................. 228/37
4,332,342 6/1982 van Der Put ................. 228/180 A

FOREIGN PATENT DOCUMENTS 1099330 1/1968 United Kingdom ............ 228/37
627934 10/1978 U.S.S.R. ..................... 228/37

Primary Examiner—Nicholas P. Godici
Assistant Examiner—Marc Hodak
Attorney, Agent, or Firm—Stephen F. K. Yee

[57] ABSTRACT

Printed circuit boards bearing chip type electric parts on its underside surface and travelling along a predetermined path are soldered using first and second molten solder, successively. The first molten solder is forced to overflow from a nozzle member to form a wave of overflowing solder extending in the direction of the path of travel of the printed circuit board so that the lower side of the printed circuit board is brought into co-current contact with the upper surface of the solder wave for effecting both preheating and first soldering treatment by the first molten solder. A solder applicator is provided adjacent to and downstream of the nozzle member to effect a second soldering treatment by the second molten solder.

5 Claims, 4 Drawing Figures

SOLDERING APPARATUS

BACKGROUND OF THE INVENTION

1. Field of the Invention

This invention relates to an apparatus for soldering printed circuit boards.

2. Description of the Prior Art

To reply to recent demands for compact electrical appliances and instruments, there is a tendency of using small thin chip type electric parts for mounting on the printed circuit boards in place of the conventional discrete type electric parts. From the view point of the parts mounting operation, the chip type parts also excel the discrete type parts in that the former can be fixed on a board by face bonding and can be mounted in positions automatically in a facilitated manner and at a lower cost, whereas the latter parts are difficult to insert into the printed circuit boards by an automatic operation and involves an increased number of steps, for example, a step for cutting off pendant lead wire portions.

Although there have thus far been proposed various soldering apparatuses for printed circuit boards, they invariably give rise to problems of soldering failures when applied to printed circuit boards bearing the chip type parts due to the recesses defined between adjacent chip type parts or behind the chip type parts as seen in the direction of travel of the boards. Such recesses or space can block the molten solder from flowing thereinto and can trap gases therein, causing incomplete deposition of the solder. The air bubbles which are once trapped in the recesses are difficult to remove even if the molten solder is poured over the printed circuit board over a long time period.

In addition, the conventional soldering technique involves a problem that the chip type parts unavoidably undergo thermal shocks when subjected to the soldering temperature. More specifically, with the conventional soldering apparatus, even if the printed circuit boards are preheated to a level proximate to the soldering temperature in a preheating zone, there would occur a material temperature drop during the transfer thereof from the preheating zone to the soldering zone. As a matter of fact, since there is a limit in the preheating temperature, it is difficult to control the temperature of the printed circuit boards as introduced into the soldering zone to a level close to the soldering temperature.

SUMMARY OF THE INVENTION

With the foregoing situations in view, the present invention has as an object the provision of an apparatus for soldering printed circuit boards, which is capable of depositing solder securely in recessed portions which may exist on the printed circuit boards.

It is a more specific object of the present invention to provide a soldering apparatus for printed circuit boards with chip type electric parts.

According to the present invention there is provided an apparatus for soldering printed circuit boards, which comprises: a first open-topped tank holding therein a first molten solder and a second open-topped tank located in a position adjacent to and downstream of the first tank along the path of travel of the printed circuit board and holding therein second molten solder. An upwardly extending nozzle member is disposed within the first tank, from which the first molten solder is forced to overflow to form a wave of overflowing solder extending in the direction of the path of travel of the printed circuit board. Means is provided for applying second molten solder in the second tank to the printed circuit board. Thus, during its passage over the first tank, the lower side of the printed circuit board is brought into co-current contact with the upper surface of the solder wave so that the printed circuit board is preheated and applied with the first molten solder. The printed circuit board is then subjected to a soldering treatment by the second molten solder, whereby the electric parts mounted on the board may be completely and firmly connected thereto.

BRIEF DESCRIPTION OF THE DRAWINGS

The above and other objects, features and advantages of the present invention will become apparent from the detailed description of the invention which follows, taken in conjunction with the accompanying drawings in which.

DESCRIPTION OF THE PREFERRED EMBODIMENTS

Figure 1:
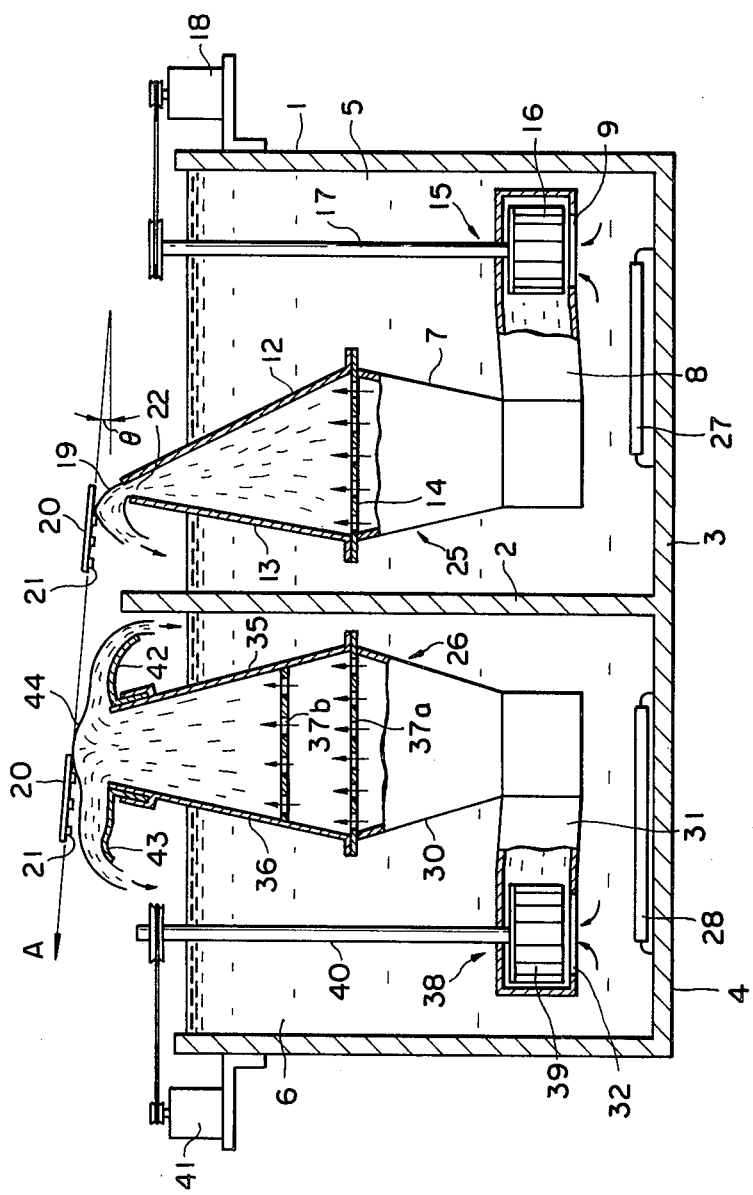
FIG. 1 is a cross-sectional, elevational view diagrammatically showing a soldering apparatus embodying the present invention.
Figure 2:
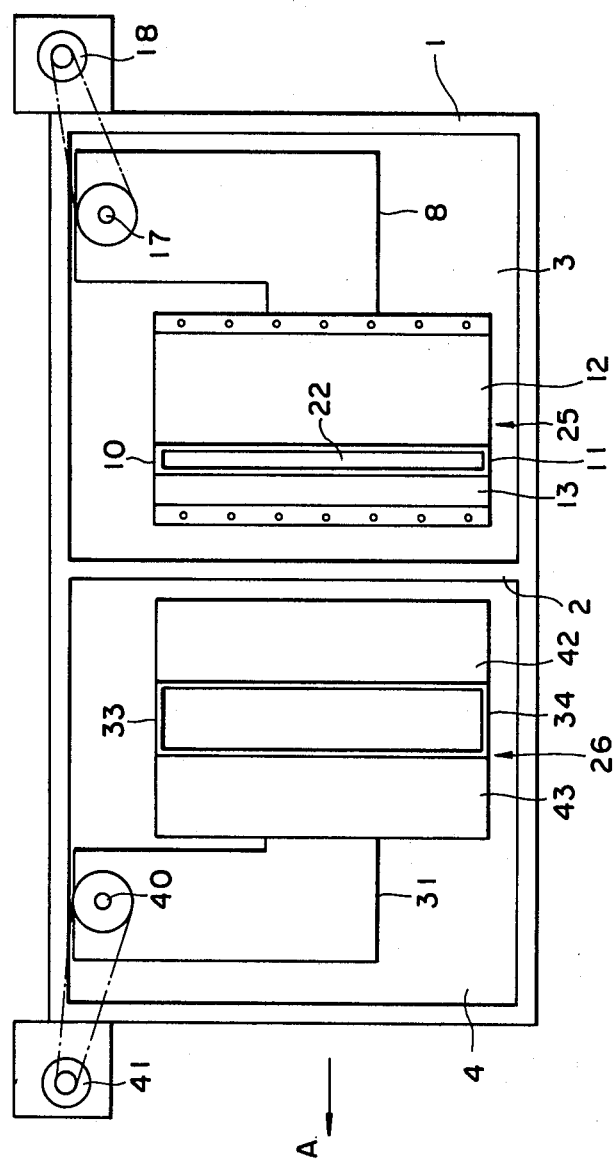
FIG. 2 is a plan view of FIG. 1.

Referring to FIGS. 1 and 2, the reference numeral 1 denotes a pot which is generally rectangular in shape and which is open on the top side thereof. The pot 1 is divided by a partition wall 2 into separate first and second tanks 3 and 4 in a tandem fashion. The first and second tanks 3 and 4 contain molten solders or melts 5 and 6, respectively. The melts 5 and 6 are maintained at suitable temperatures by heating elements 27 and 28 such as electric resistance coils or the like. Normally, the melt 5 in the first tank 3 is maintained at a temperature in the range of 235° to 240° C., while the melt 6 in the second tank 4 is maintained in a temperature range generally slight higher than that of the melt 5, more specifically, in the range of 240° to 245° C. The melts 5 and 6 are respectively applied to printed circuit boards by solder applicator means which are generally indicated by reference numerals 25 and 26.

Disposed within the first tank 3 is an upwardly extending nozzle member 7, the lower end of which is connected to one end of a conduit 8. At the other end, the conduit 8 is provided with a molten solder supply hole 9 which is opened toward the bottom of the tank 3. Consequently, the lower portion of the nozzle member 7 is in flow communication with the first tank 3. The nozzle member 7 is formed in a substantially rectangular shape in section and has a sectional area gradually reduced from its middle portion toward its upper tip end. More specifically, of the two pairs of opposing side walls 10 to 13 which define the configuration of the nozzle member 7, the side plates 10 and 11 are disposed substantially parallel with each other but the front and rear plates 12 and 13 are converged toward the upper end of the nozzle member 7.

A feed means 15 is provided in the tank 3 for continuously supplying the molten solder 5 in the first tank 3 to the nozzle member. The feed means 15 preferably includes a propeller assembly 16 which is disposed in the conduit 8 adjacent to the opening 9. The propeller 16 is provided with a shaft 17 which is connected to drive means including a motor 18, so that it is rotated about the shaft 17 upon actuation of the motor 18 to supply the molten solder 5 in the first tank 3 continuously to the nozzle 7. The supplied molten solder flows upward through the nozzle 7 and overflows from its upper end 22 to return to the first tank 3.

The overflow outlet 22 which is defined at the upper ends of the front and rear plates 12 and 13 of the nozzle 7 is oriented such that the molten solder overflowing therefrom forms a wave 19, generally a standing wave, extending in the direction of arrow A as shown particularly in FIG. 1. Printed circuit boards 20 each having chip type parts 21 temporarily attached to its lower side by means of an adhesive or the like are fed from right to left in FIG. 1 or in the direction of arrow A along a predetermined path of travel by operation of ordinary transfer means. In this instance, it is preferred that the printed circuit board 20 travel in a rearwardly inclined posture and along a similarly inclined path of travel at an angle of $\theta$ with a horizontal plane so that the molten solder excessively applied to the board can drop in a facilitated manner. As the printed circuit board 20 passes over the nozzle 7, its lower side is brought into co-current contact with the molten solder wave 19 for soldering the parts on the underside of the printed circuit board 20. Since the upper surface of the solder wave 19 is in movement in the same direction as the printed circuit board 20, the molten solder can arrive at the recessed portions behind the chip parts in an accelerated manner without permitting gases to be trapped in those portions. Indicated at 14 is a perforated plate which is employed to control the uniform upward flow of the molten solder through the nozzle 7, across the width thereof.

The printed circuit board 20 which has undergone the soldering treatment with the molten solder 5 in the first applicator means 25 is then passed to the adjacently located second applicator means 26 for contact with the second molten solder 6 which is generally maintained at a higher temperature than the first melt 5. The second solder applicator means 26 may be arranged in the same manner as the above-described first applicator means 25. In this instance, however, it is preferred that the second applicator means be adapted to form a solder wave which is directed in a direction reverse to the wave 19, namely, in a direction opposite to the arrow A. By so doing, the lower side of the printed circuit board 20 is held in counter-current contact with the molten solder. Nevertheless, it is more preferred that the second applicator means 26 be of the type which is adapted to overflow the molten solder on the front and rear sides thereof as shown particularly in FIG. 1.

The second soldering means 26 of FIG. 1 is provided with an upwardly extending riser portion 30 within the second tank 4. The lower end of the riser 30 is connected to one end of a conduit 31 and communicates directly with the second tank 4 through a solder feed port 32 which is opened toward the bottom of the second tank 4 at the other end of the conduit 31. The riser 30 is substantially rectangular in section and has a sectional area gradually reduced from its middle portion toward its upper tip end. More specifically, the riser 30 is constituted by two parts of opposing side plates 33 to 36, namely, a pair of substantially parallel side plates 33 and 34 and a pair of upwardly converging side plates 35 and 36.

The second applicator means 30 is provided with a solder feeder 38 similar to the feeder 25 of the first applicator means 25, including a propeller 39 which is driven from a motor 41 to rotate about a shaft 40 for supplying the molten solder 6 in the tank 4 to the riser 30 through the opening 32. The side plates 35 and 36 of the riser 30 are inclined substantially symmetrically as shown in the drawing and provided with guide members 42 and 43 at the respective upper ends. Thus, the molten solder which is forced to flow upwardly through the riser 30 flows out from the upper end of the riser, forming an overflow layer of molten solder flowing in two opposite sides with its transversely extending center portion 44 slightly rising. The overflown solder returns to the tank 4. The lower side of the printed circuit board 20 is contacted with the center portion 44 of the overflowing solder layer to effect a second soldering treatment. The part chips which have the respective rear portions sufficiently soldered in the soldering treatment of the first stage are completely connected to the printed circuit board 20 by the soldering treatment of the second stage both mechanically and electrically. Moreover, the first stage treatment can serve as a preheating step for the second soldering stage and, hence, the soldering treatment in the second stage can be performed effectively without exerting thermal stresses on the electric parts on the board. Denoted at 37a and 37b are flow control plates which correspond to the aforementioned plate 14.

Figure 4:
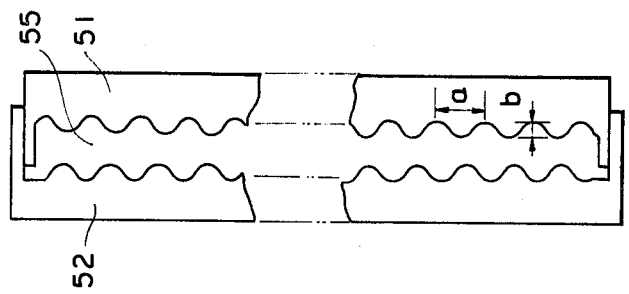
FIG. 4 is a fragmentary plan view of the nozzle member of FIG. 3.
Figure 3:
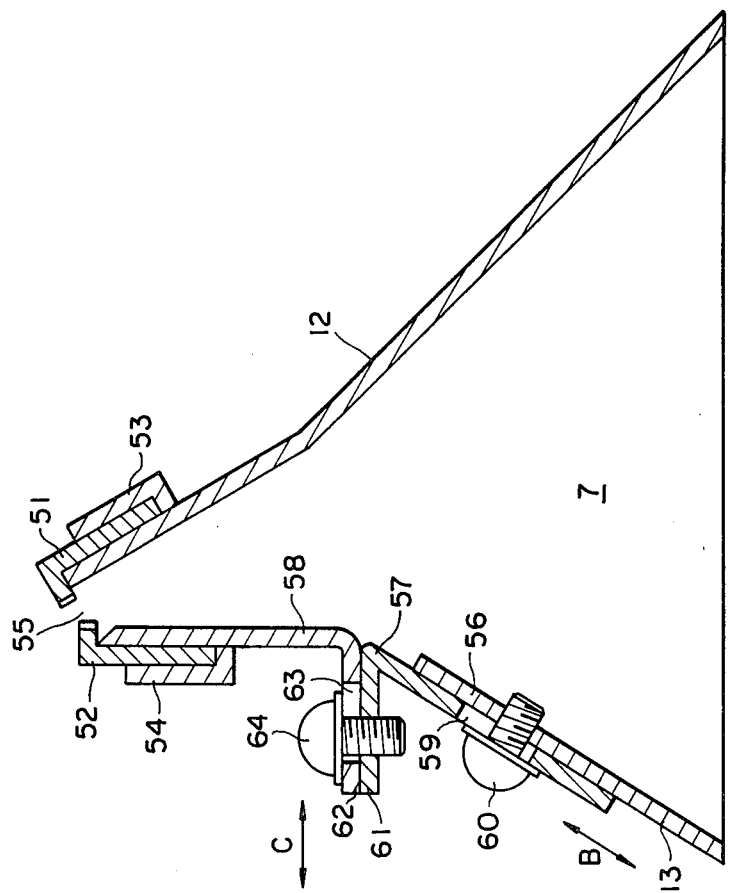
FIG. 3 is a cross-sectional, elevational view showing, on an enlarges scale, an example of the nozzle member.

Referring now to FIGS. 3 and 4, there is shown a preferred form of the above-described nozzle member 7. In the particular example shown, the opening at the spouting end of the nozzle 7 is defined by a pair of attachment plates 51 and 52 with teeth at the opposing inner edges. The toothed attachment plates 51 and 52 are detachably supported in holders 53 and 54 which are provided on the side plates 12 and 13 adjacently to the upper tip end of the nozzle 7, and when mounted in position, they define therebetween a wavy outlet 55 as shown in FIG. 4. The opposing inner edges of the attachment plates 51 and 52 may be toothed in the form of a sawtooth or square wave instead of the sinuous or sine wave form which is used in the particular example shown. A nozzle construction with toothed portions around its outlet in this manner serves to roughen the upper surfaces of the molten solder which overflows from the nozzle, thereby urging the molten solder into the recessed portions on the lower side of the printed circuit board. In this connection, it is recommended that the crest-to-root distance (b) of the toothed portions is in the range of 2 to 5 mm and the root-to-root distance (a) in the range of 4 to 10 mm. The marginal edge of the attachment plate 52 may be formed straight if desired.

The embodiment shown in FIG. 3 has another feature in that the height and direction of the overflowing solder wave can be adjusted arbitrarily. In the case of the nozzle 7 (or riser 30) of FIG. 1, it is possible to adjust the height of the solder wave 19 (or center portion 44) by controlling the rotational speed of the motor 18 (or 41), but it is insufficient for forming optimum waves according to the printed circuit board to be soldered. Thus, in the embodiment shown in FIG. 3, the side plate 13 of the nozzle 7 is split into a fixed portion 56, an obliquely movable portion 57 and a horizontally movable portion 58. The movable plate 57 is provided with a slot 59 and fixed to the fixed portion 56 by a screw 60 which is threaded into the fixed portion 56 through the slot 59. Therefore, the movable plate 57 is adjustable in the direction B (in the direction of inclination of the fixed portion 56) by a distance determined by the length of the slot 59 and the diameter of the screw 60. Similarly, a screw 64 is threaded into a flange portion 61 of the movable plate 57 through a slot 63 in an overlying flange portion 62 of the movable plate 58 to support the latter adjustably on the movable plate 57, so that the movable plate 58 is adjustable in the direction C (normally in the horizontal direction) relative to the movable plate 57. Thus, it is possible to adjust the orientation and size of the overflow outlet 55 by shifting the positions of the movable plates 57 and 58 for the purpose of adjusting the direction and height of the overflowing solder wave.

I claim:

1. An apparatus for soldering printed circuit boards moving along a predetermined path of travel, said apparatus comprising:
    a first open-topped tank for containing a first quantity of molten solder;
    a second open-topped tank located adjacent to and downstream of said first tank along said path of travel of said printed circuit boards for containing a second quantity of molten solder;
    an upwardly extending nozzle member disposed within said first tank and having a lower end portion in flow communication with said first tank;
    feed means operable for supplying the molten solder in said first tank to said nozzle member to cause the molten solder to overflow from the upper tip end of said nozzle member;
    said nozzle member being configured to form a wave of overflowing solder extending from an upper outlet only in the direction of travel of said printed circuit boards, said outlet having an inner toothed edge portion for roughening the upper surfaces of said wave of overflowing solder, said outlet having adjustable means to provide for the adjustment of the direction and height of said overflowing solder wave;
    an upwardly extending riser disposed within said second tank and having a lower end portion in flow communication with said second tank; and
    second feed means operable for supplying the molten solder in said second tank to said riser to cause the molten solder to overflow from the upper end of said riser, said upper end of said riser being so arranged to form an overflowing solder layer flowing in directions the same as and opposite to the direction of the travel of said printed circuit boards,
    whereby the lower surface of each printed circuit board is first brought into co-current contact with the upper surface of said wave formed by said nozzle to preheat said printed circuit board and to apply molten solder thereto, and said printed circuit board, after being subjected to the treatment with molten solder from said first tank, is then brought into co-current and counter-current contact with the upper surface of said overflowing solder layer from the upper end of said riser.

2. The apparatus as set forth in claim 1, wherein said nozzle member is constituted by a first pair of opposing side plates disposed parallel with each other and a second pair of opposing front and rear plates upwardly convergent to form between the converged upper ends thereof an elongated overflow outlet extending in a direction perpendicular to said path of travel of said printed circuit boards, the position of the upper end of at least one of said front and rear plates being adjustable vertically and adjustable horizontally along said path of travel to vary the orientation and size of the area of said overflow outlet to provide for the adjustment of the direction and height of said overflowing solder wave.

3. The apparatus as set forth in claim 2, wherein the converged upper ends of said front and rear plates are provided with toothed portions extending along the inner opposed edges of said plates, with an outlet passage extending between said edges.

4. The apparatus as set forth in claim 2, wherein said riser comprises a pair of parallel, oppositely-disposed plates angularly positioned so that the upper ends of said plates converge toward each other, each of said riser upper ends having a guide member to direct the flow of solder back into said second tank, said second feed means operable to cause said bidirectional overflowing solder layer to have a central portion, extending transversely relative to said path of travel, of a greater height than the bidirectional flowing solder layer portions.

5. The apparatus as set forth in claim 1, wherein the lower surface of each printed circuit board is disposed at an upwardly-directed, positive inclination relative to the horizontal path of travel as said board is passed over the wave formed by said nozzle and the solder layer from said riser.

* * * * *